(12) United States Patent
Kropp et al.

(10) Patent No.: US 6,500,891 B1
(45) Date of Patent: Dec. 31, 2002

(54) LOW VISCOSITY THERMALLY CONDUCTIVE COMPOSITIONS CONTAINING SPHERICAL THERMALLY CONDUCTIVE PARTICLES

(75) Inventors: Philip Kropp, Newington, CT (US); Robert Cross, Rocky Hill, CT (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/850,757

(22) Filed: May 8, 2001

Related U.S. Application Data

(60) Provisional application No. 60/205,953, filed on May 19, 2000.

(51) Int. Cl.[7] .................................................. C08K 3/18
(52) U.S. Cl. ...................................... 524/430; 524/437
(58) Field of Search ................................. 524/404, 430, 524/437

(56) References Cited

U.S. PATENT DOCUMENTS

| | | |
|---|---|---|
| 4,159,976 A | 7/1979 | Moran, Jr. |
| 4,292,223 A | 9/1981 | Theodore et al. |
| 4,916,184 A | 4/1990 | Clark |
| 4,957,960 A | 9/1990 | Harris et al. |
| 5,021,487 A | 6/1991 | Klemarczyk |
| 5,283,542 A | 2/1994 | Ochiai et al. |
| 5,340,781 A | 8/1994 | Oda et al. |
| 5,362,775 A | 11/1994 | Shintai et al. |
| 5,539,218 A * | 7/1996 | Takahama et al. .......... 257/788 |
| 5,679,719 A | 10/1997 | Klemarczyk et al. |
| 5,731,370 A | 3/1998 | Shiobara et al. |
| 5,750,631 A | 5/1998 | Murata et al. |
| 5,864,178 A | 1/1999 | Yamada et al. |
| 5,872,194 A | 2/1999 | Isshiki et al. |
| 5,935,314 A | 8/1999 | Higuchi et al. |

FOREIGN PATENT DOCUMENTS

| | | |
|---|---|---|
| EP | 0 499 585 B1 | 8/1992 |
| EP | 0 499 585 A1 | 8/1992 |
| JP | 5222270 A | 8/1993 |

\* cited by examiner

Primary Examiner—Edward J. Cain
(74) Attorney, Agent, or Firm—Hoffmann & Baron, LLP

(57) ABSTRACT

The present invention discloses a thermally conductive adhesive composition that is useful for encapsulating electronic parts. More particularly, this invention provides adhesive compositions that have 90% of the alumina particles having an average diameter sufficiently low to maintain the particles in suspension. The thermally conductive compositions of the present invention have a low viscosity and excellent thermal conductivity properties. Also contemplated is an electronic part that is encapsulated with the inventive composition, an article of manufacture having a container with the inventive composition contained therein and a method of manufacturing the inventive thermally conductive adhesive composition.

19 Claims, 2 Drawing Sheets

LOW VISCOSITY THERMALLY CONDUCTIVE COMPOSITIONS CONTAINING SPHERICAL THERMALLY CONDUCTIVE PARTICLES

This patent claims priority to U.S. Provisional Application No. 60/205,953, filed May 19, 2000, entitled: Low Viscosity Thermally Conductive Compositions Containing Spherical Thermally Conductive Particles".

FIELD OF THE INVENTION

The present invention relates to thermally conductive adhesive compositions, and more particularly, to low viscosity thermally conductive adhesive compositions filled with spherical thermally conductive particles, which find use in electronic applications.

BRIEF DESCRIPTION OF RELATED TECHNOLOGY

Thermally conductive adhesive compositions are useful in many applications'such as in electronics, ceramics, paints and coatings, where an effective thermal contact is sought, such as between a thermocouple probe and a heat source, or between two bolted metal parts having an air gap across which heat is transferred.

Thermally conductive compositions are particularly useful to encapsulate electronic components, such as semiconductors. These compositions protect the electronic components from corrosion and serve as a conduit to remove heat to a heat sink during normal operation. The compositions enhance the performance of electronic parts and have been particularly helpful in their miniaturization.

Recent advances in semiconductor technology have led to chips with more power and higher densities, which are challenging the capabilities of the currently available thermally conductive compositions. To increase the thermal conductivity, conventional thermally conductive compositions typically contain higher concentrations of thermally conductive particles, e.g., high load compositions, which provides the maximal dense particle to particle contact of the thermally conductive particles to minimize interface thermal resistance for forming a good thermal path. However, such high load compositions do not always yield physical properties suitable for every end-use application.

For instance, high load compositions typically have a high viscosity, e.g. 200,000–300,00 cps at 25° C., which results in poor flowability during application. Additionally, high load, high viscosity compositions may have a high thermal conductivity often resulting in thick bond lines which reduce the efficiency of the heat transfer. Increasing pin counts in smaller amounts of space demands a thermally conductive composition with a lower viscosity to enable thin, precise lines to be formed on the micro-sized semiconductors, thereby allowing for the development of efficient miniaturized parts. Thermally conductive compositions with a low viscosity are also desirable for the new, more powerful and denser semiconductor chips currently being designed because low viscosity compositions have better flowability. Low viscosity, thermally conductive compositions, such as those having a viscosity under 80,000 cps at 25° C., are also particularly desirable for fragile chips and solder bonds that attach the chips to a substrate because the minimal force necessary to apply the adhesive to the semiconductor chip is reduced, thereby decreasing the risk of compromising the integrity of a fragile chip.

To reduce the viscosity of conventional thermally conductive compositions, lower loads of the thermally conductive component may be used, however, this act also reduces the thermal conductivity of the composition. Lower load compositions also may exhibit increased moisture absorbency, which may cause the semiconductor assembly to crack when heated due to the rapid expansion of internal moisture. This may result in disruption of the connectivity of the conductive particles, causing a disconnect in the microelectronic device in which the semiconductor is used.

Additionally, reducing the load of the thermally conductive component may also increase settling of the conductive particles over time and during curing. The tendency of the thermally conductive particles to settle out during heat cure is of particular concern. Heat cure causes the viscosity of the composition to decrease, allowing the thermally conductive particles to settle to the bottom of the adhesive film. The top layer, if deficient of thermally conductive particles, becomes thermally insulating and reduces thermal conductivity of the film. Thus, current high load and low load thermally conductive compositions are less than satisfactory.

Accordingly, it would be desirable to provide a thermally conductive composition is highly conductive and has a low viscosity providing excellent flowability.

SUMMARY OF THE INVENTION

The present invention provides a thermally conductive composition which, due to the incorporation of spherical thermally conductive particles therein, exhibits excellent flowability. The cured inventive compositions are highly conductive and have enhanced mechanical, moisture resistance and chemical resistance properties. The compositions of the present invention may be used as adhesives, sealants as well as coatings and the like. For purposes of this invention, the term "sealants" will include all such uses.

In one aspect of the invention there is provided a low-viscosity, thermally conductive composition which includes a curable resin component, a curing agent for the curable resin component, and a thermally conductive component which includes spherical thermally conductive particles substantially uniformly throughout the composition. A predominant amount of the spherical particles, and desirably at least 90% of the spherical particles, have an average diameter sufficiently low to maintain the particles in suspension. Desirably the spherical, thermally conductive particles are spherical alumina particles. The low-viscosities of the present invention are desirably between about 10,000 to about 80,000 cps at 25° C.

Another aspect of the invention includes the reaction product of such a low-viscosity, thermally conductive composition.

Also contemplated by the present invention is an article of manufacture, which includes the inventive flowable thermally conductive composition stored in an openable container for packaging the flowable thermally conductive adhesive composition of the present invention.

Another aspect of the invention provides an electronic part encapsulated by the inventive composition. For example, such parts may include a wiring circuit board and a semiconductor chip mounted through electrodes to the circuit board and a space between the circuit board and the semiconductor. The periphery of the semiconductor chip is desirably encapsulated with the inventive thermally conductive compositions. Also contemplated are methods to encapsulate an electronic part, including the steps of providing the inventive thermally conductive composition and applying an effective amount of the composition to the electronic part to thereby encapsulate the electronic part.

Yet another aspect of the invention relates to a method of manufacturing a thermally conductive composition. Such a method includes combining in admixture at least one curable resin component with at least one curing agent for the curable resin component and a thermally conductive component. The thermally conductive component includes spherical thermally conductive particles. A predominant amount, and desirably at least 90% of the spherical particles, have an average diameter sufficiently low to maintain their suspension in the low viscosity sealant composition.

Yet another aspect of the invention relates to a thermally conductive, low viscosity composition which includes (a) a resin component; (b) a curing agent for the resin component; and (c) a combination of thermally conductive particles, which desirably are spherical alumina particles and a suspension aid for maintaining the conductive particles in suspension, i.e. improving their resistance to settling-out. The suspension aid is desirably zinc oxide. This suspension aid is particularly useful in preventing the tendency of the thermally conductive particles from settling-out, e.g. particularly during heat cure of the resin. Such settling out can be substantially decreased or prevented by the inclusion of a suspension aid.

DETAILED DESCRIPTION OF THE INVENTION

Figure 1:
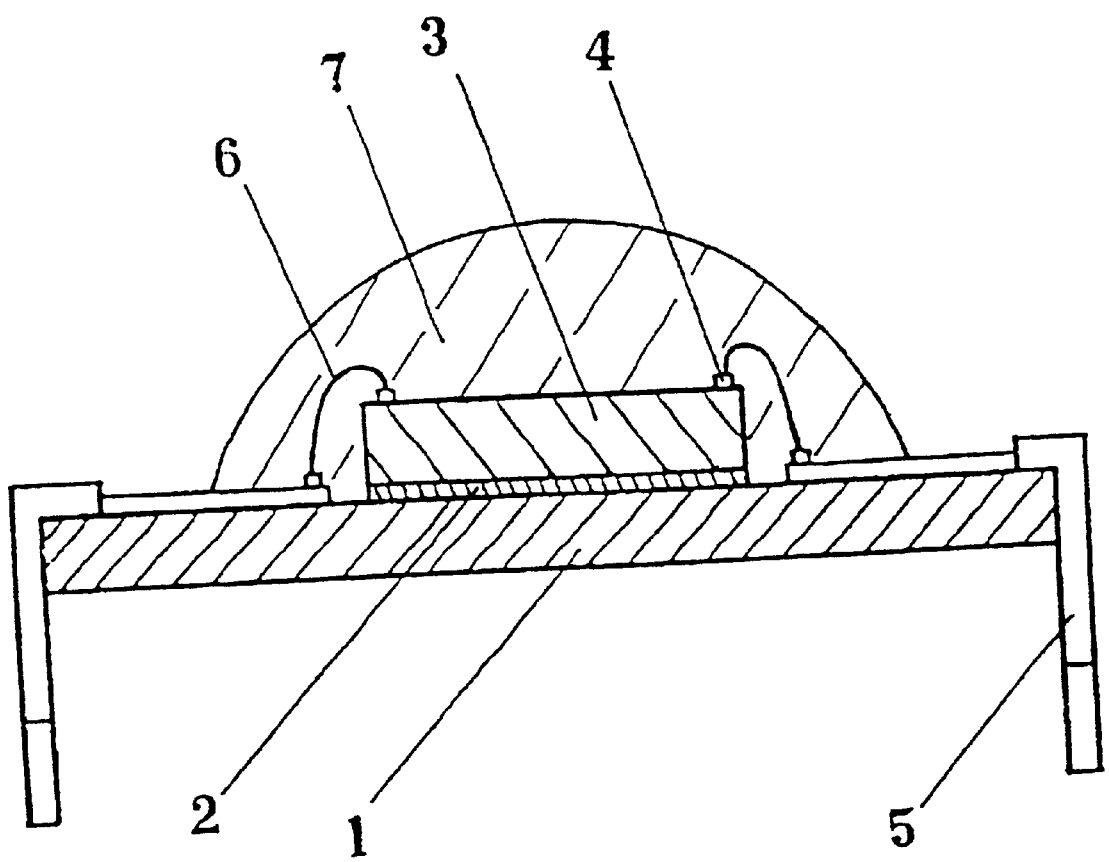
FIG. 1 is a sectional view of an electronic part assembled with the compositions of the present invention.

The present invention provides a thermally conductive composition particularly useful for electronic applications, such as encapsulating semiconductor devices. Specifically, the inventive composition has a high concentration of thermally conductive particles while retaining a surprisingly low viscosity giving it excellent flowability. It is also able to cure rapidly, such as during a solder reflow process, giving a cured product with excellent mechanical, moisture resistance and chemical properties.

High loads of the thermally conductive particles in the inventive compositions help minimize the problem of particles settling while retaining a low viscosity composition. Suspension aiding agents, such as zinc oxide, may be included in the adhesive composition to further minimize the settling of particles. For instance, adding zinc oxide to the inventive composition may be desirable to extend pot life. Additionally, since zinc oxide typically increases the viscosity of a composition, it may be added in situations where a higher viscosity adhesive is desired. The combination of the suspension aid and additive and the conductive particulars is chosen to balance the desired viscosity with the desire thermal conductivity. Furthermore, zinc oxide is thermally conductive, so zinc oxide may be added to raise the thermal conductivity of the adhesive composition. The ratio of zinc oxide to the thermally conductive particle may be from 2 to 1 to 10 to 1, such as 3 to 1.

The composition of the present invention includes a curable resin component in amounts of about 5 to about 60 percent by weight of the total composition; a curing agent for the resin component in amounts of about 0.1 to about 10 percent by weight of the total composition; and a thermally conductive component in amounts of about 40 to about 80 percent by weight of the total composition. Other materials such as plasticizers, adhesion promoters, viscosity modifiers, pigments and the like may be incorporated into the inventive composition in amounts sufficient to achieve their purpose. Generally, useful amounts of these materials about 0.1 to about 20.0 percent by weight of the total composition.

Desirably, the thermally conductive component includes highly thermally conductive, generally spherical particles, substantially free of sharp or dendritic geometry. The spherical shape of the particles reduces the abrasion between the alumina particles, thereby serving to reduce the viscosity of the overall composition. The spherical particles generally have a mean particle size of 10 $\mu$m, and at least 90% of the particles have an average diameter sufficiently low to maintain their suspension in the inventive composition. Desirably the spherical thermally conductive particles are spherical alumina particles wherein 90% have a diameter of less than 24 microns. Such spherical alumina particles are available from Showa Denko under the trademark AS-50. Desirably, the thermally conductive particles are incorporated in a predominant amount of the total composition, e.g. in amounts from about 40% to about 80% by weight of the total composition and more desirably from about 65% to about 75% by weight of the total composition.

Many curable resins are switchable for use herein including expoxy resins, such as Bisphenol A or F type epoxy resins.

It is desirable that the viscosity of this resin at 25° C. is between 10 to 1,000,000 centipoise and that the resin component, e.g. epoxy resin, is present in amounts of about 5 to about 60% weight of the total composition. Desirably, the curable resin component is capable of curing at a temperature that will not degrade or otherwise deleteriously affect the surrounding parts of the semiconductor.

The curable resin component may have one, two or more epoxide functional groups in a molecule. The molecular structure of this resin may be linear, linear with some branching, branched, cyclic or resin-form. Other optional epoxy compounds may be present which have both epoxy functionality and olefinically unsaturated functionality ("dual-functional" resins).

Examples of suitable epoxy resins include glycidyl ether type epoxy resins such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins and combinations thereof The inventive composition may be cured in various ways, such as through heat curing, actinic radiation curing and combinations thereof Heat curing has been found to be particularly useful because it provides significant processing and handling advantages during the application of the adhesive composition. Actinic radiation, e.g., UV light, may provide processing and handling advantages during manufacture by instantly immobilizing the composition, as described below. Immobilization of the resin is controlled to provide sufficient gelation to prevent flow out of the part.

Any curing agent capable of curing the curable resin component may be used. Useful curing agents include amines, peroxides, anhydrides, phenol compounds, acid anhydride compounds and combinations thereof In particular, phenol resins having at least two phenolic hydroxyl groups in a molecule are useful. In general, the curing agent is employed in amounts sufficient to cure the adhesive composition. Particularly useful amounts of the curing agent are from about 0.1 to about 10% of the total composition. Particularly useful curing agents include dicyandiamide, 1-(2 cyanoethyl) 2-ethyl-4-methylimidazole, 1-benzyl 2-methylimidazole, ethyl cyano propyl imidazole and combinations thereof.

The use of imidazole compounds as curing agents results in epoxy resins with very good physical properties. The imidazole type agents utilized in the compositions of the present inventions are typically organic heterocyclic compounds containing a five-membered diunsaturated ring with two nonadjacent nitrogen atoms as part of the ring. Typically, these imidazoles are described by the following formula:

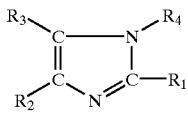

$R_1$, $R_2$, $R_3$ and $R_4$ are H or lower alkyl of 1–4 carbon atoms, alkaryl, or benzyl groups, optionally substituted. Typically, either or both $R_2$ and $R_4$ will be hydrogen. Of course, substituents should not be selected so as to cause steric hindrance or other undesirable effects. Useful imidazoles include 2-methylimidazole, 2-phenylimidazole, 2-ethyl-4-methylimidazole, 2-undecylimidazole, 1-cyanoethyl-2-methylimidazole, 2,4-dicyano- 6,2-methylimidazolyl- (1)-ethyl-s-triazine, and 2,4-dicyano- 6,2-undecylimidazolyl-(1)-ethyl-s-triazine, imidazolium salts (such as 1-cyanoethyl-2-undecylimidazolium trimellitate, 2-methylimidazolium isocyanurate, 2-ethyl-4-methylimidazolium tetraphenylborate, and 2-ethyl-1,4-dimethylimidazolium tetraphenylborate and combinations thereof.

Other useful curing agents include phosphine compounds such as tributylphosphine, triphenylphosphine, tris(dimethoxyphenyl)phosphine, tris(hydroxypropyl) phosphine, and tris(cyanoethyl)phsphine, phosphonium salts such as tetraphenylphosphoniumtetraphenylborate, methyltributylphosphoniumtetraphenylborate, and methyltricyanoethylphosphonium tetraphenylborate), amines such as 2,4,6-tris(dimethylaminomethyl)phenol, benzylmethylamine, tetramethylbutylguanidine, N-methylpiperazine, and 2-dimethylamino-1-pyrroline, ammonium salts such as triethylammonium tetraphenylborate, diazabicyclo compounds such as 1,5-diazabicyclo(5,4,0)-7-undecene, 1,5-diazabicyclo(4,3,0)-5-nonene, and 1,4-diazabicyclo(2,2,2)-octane, and salts of diazabicyclo compounds such as tetraphenylborate, phenol salt, phenolnovolac salt, and 2-ethylhexanoic acid salt.

Exemplary phenol resin curing agents include phenol novolac resins, cresol novolac resins, phenol aralkyl resins, naphthalene type phenol resins, cyclopentadiene type phenol resins, and phenolic hydroxyl group-containing phenol resins of the following structure: wherein R is hydrogen or an alkyl group having 1 to 4 carbon atoms, such as methyl, ethyl, propyl, isopropyl, butyl, iso-butyl and tert-butyl, and n is an integer of 0 to 5.

Various photoinitiators may be used, including benzoin, benzoin methyl ether, benzoin ethyl ether, benzoin n-propyl ether, benzoin isobutyl ether, 2,2 dihydroxy-2-phenylacetophenone, 2,2-dimethoxy-2-phenylacetophenone 2,2-diethoxy-2-phenylacetophenone, 2,2-diethoxyacetophenone, benzophenone, 4,4-bisdialylaminobenzophenone, 4-dimethylaminobenzoic acid, alkyl 4-dimethylaminobenzoate, 2-ethylanthraquinone, xanthone, thioxanthone and 2-cholorothioxanthone and combinations thereof Other additives may be used with the inventive compositions in amounts that impart desirable properties such as desirable coloring to the composition but do not substantially interfere with the objectives of the present invention, that is, the low viscosity thermally conductive nature of the composition. Useful amounts of additives are from about 0.1 to about 20.0 percent by weight of the total composition.

Useful additives include viscosity modifiers, suspension aiding agents, pigments, such as coloring agents and fluorescent agents, stress reducing agents, coupling agents, curing inhibitors/stabilizers and the like. Particularly useful additives include viscosity modifiers such as amorphous hydrophobic silica.

The composition of the present invention may be used for transfer molding, injection molding, potting, casting, dip coating, drip coating by means of a dispenser, etc., spray coating, brush coating and the like. As long as the composition of the present invention is liquid, there are no restrictions on the viscosity of the composition at 25° C., and the composition may be used in configurations ranging from a low-viscosity liquid with a viscosity of 100 centipoise to a high-viscosity paste with a viscosity of 1,000,000 centipoise. The inventive compositions are particularly useful in situations where a low viscosity composition is desirable. Furthermore, in the case of the composition of the present invention, the cured product obtained by curing the composition shows excellent thermal conductivity as well as excellent pliability, initial bonding characteristics and bonding durability in spite of the fact that said cured product has a relatively high hardness. Accordingly, the composition of the present invention is suitable for use as a covering agent or bonding agent (e.g., protective agent, sealing agent or impregnating agent, etc.) for electrical and electronic parts.

The electronic part of the present invention is characterized by the fact that the part is sealed by means of the cured inventive composition. Examples of electronic parts or devices which can be sealed in this way include semiconductor devices and the like as well as capacitors, electrical resistors and manufacturing of printed circuit boards. Note that when sealing a semiconductor device, it is possible to make use of conventionally used molding methods, such as transfer molding, injection molding, casting and the like. The electronic part of the present invention will be described in detail with reference to the attached figures. For example, as is shown in FIG. 1, the electronic part of the present invention has the following structure: a semiconductor element 3 is mounted on a circuit board 1 via a bonding agent 2, and bonding pads 4 located on the upper portion of this semiconductor element 3 are electrically connected to a lead frame 5 on the circuit board 1 by means of bonding wires 6, the semiconductor element 3 is encapsulated by the cured inventive composition.

Also contemplated by the present invention are methods to encapsulate such a part by applying an effective amount of the composition to an electronic part. There are no particular restrictions on the method used to manufacture the electronic part of the present invention. For example, any method can be used in which the electronic part is covered with the inventive compositions, after which said composition is cured by heating (in cases where the composition is a heat-curable composition) or cured by exposure to ultraviolet light (in cases where the composition is a UV-curable composition). In cases where the curable liquid-form composition is cured by heating, there are no restrictions on the temperature to which the composition is heated, provided the temperature does not thermal degrade the electronic part; for example, a temperature of about 50° C. to 250° C. is desirable.

Figure 2:
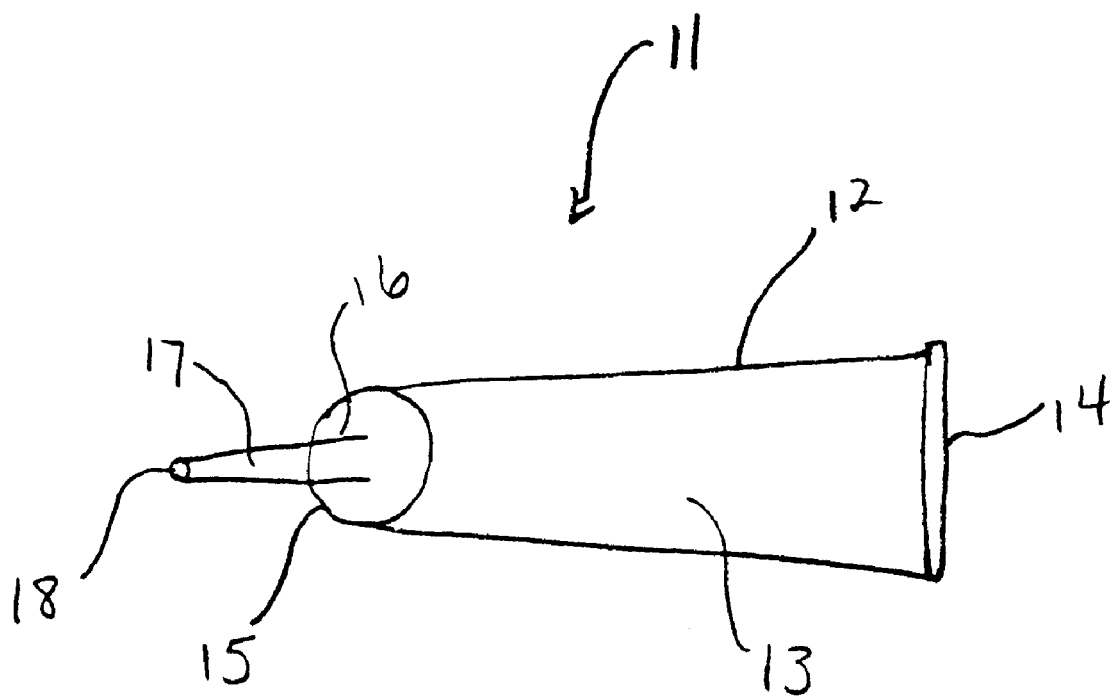
FIG. 2 is a perspective view of an article of manufacture which includes a container and the inventive composition housed therein.

Referring to the drawings, FIG. 2 shows the openable container, generally referred to as 11, of the present invention. The container 11 comprises a container wall 12 defining a product compartment 13 capable of holding the inventive composition therein. The container wall 12 has a closed end 14 and an open end 15. The open end 15 is bounded by an annular neck 16. The neck 16, in turn, is typically provided with a restrictor 17 which defines a dispensing passageway 18. The dispensing passageway 18 enables the product to be dispensed from the container. FIG. 2 shows the restrictor 17 formed in the shape of a nozzle. The restrictor, however, can also be a simple orifice reducer which is placed within the neck of the container in order to provide a smaller orifice through which to dispense the product. Desirably, container 11 is a flexible plastic.

Typically, and not shown in FIG. 2, a closure is provided to seal the product within the container, thereby decreasing exposure of the product to the external atmosphere, and increasing the useful life of the product.

The invention may be further understood with reference to the following non-limiting examples. Percent weights are per the total composition unless otherwise specified. Viscosities are measured using a Brookfield viscometer with either a spindle #6 or #4 at 10 rpm, 25° C., unless otherwise specified.

EXAMPLES

Inventive and comparative compositions were evaluated for their ability to act as thermally conductive compositions. Table 1 shows the components of the compositions that were prepared. Table 2 displays the viscosities and thermal conductivity of the compositions from Table 1.

The compositions set forth in Table 1 are prepared by blending the noted components in a Hobart® mixer, except for the thermally conductive component. The components are stirred at high shear for 1–2 minutes. The thermally conductive component is added to the mixture while it is slowly mixed. The mixture is stirred slowly for approximately 0.5 to 1 hour. The mixture is degassed by static vacuum for 10 minutes and the composition is poured into syringes and placed in a freezer at approximately −20° C.

TABLE 1

| | COMPOSITION NO. | | | | | | | | | | | | | | |
|---|---|---|---|---|---|---|---|---|---|---|---|---|---|---|---|
| | Inventive Compositions | | | | | Comparative Compositions | | | | | | | | | |
| Component | 1 | 2 | 3 | 4 | 5 | 6 | 7 | 8 | 9 | 10 | 11 | 12 | 13 | 14 | 15 |
| Curable Resin Component | | | | | | | | | | | | | | | |
| Bisphenol F (formaldehyde, polymer with oxirane and phenol) | 26.09 | 31.20 | 30.57 | 33.11 | 30.42 | 90.18 | 23.54 | 32.74 | 30.92 | 35.80 | 37.24 | 41.89 | 35.79 | 43.45 | 55.30 |
| Thermally Conductive Component | | | | | | | | | | | | | | | |
| Spherical Shaped Alumina (small particle size)* | 70.00 | 48.62 | 64.83 | 18.53 | | | | | | | | | | | |
| Spherical Shaped Alumina (large particle size)** | | | | 46.31 | 65.00 | | | | | | | | | | |
| Calcined aluminum oxide (325 mesh) | | | | | | | 56.25 | 43.22 | 65.00 | 45.00 | 60.00 | 36.67 | 60.00 | 33.33 | 30.00 |
| Zinc Oxide | | 16.21 | | | | | 18.75 | | | 15.00 | | | | | 10.00 |
| Alumina Trihydrate | | | | | | | | 21.61 | | | | 18.33 | | 16.67 | |
| Curing Agent | | | | | | | | | | | | | | | |
| Dicyandiamide | 0.54 | 0.64 | 0.63 | 0.68 | 0.63 | 1.86 | 0.48 | 0.67 | 0.64 | 0.70 | 0.77 | 0.86 | 0.74 | 0.90 | |
| 1-(2-Cyanoethyl)2-ethyl-4-, methylimidazole | 1.07 | 1.30 | 1.27 | | 1.26 | | | 1.36 | | | | 1.54 | 1.74 | 1.80 | 3.50 |
| Ethyl cyano propylimidazole | | | | 1.37 | | | 0.98 | | 1.28 | 1.30 | | | 1.48 | | |
| 1 benzyl 1,2-methylimidazole | | | | | | | | | | | | | | | |
| Viscosity Modifier | | | | | | | | | | | | | | | |
| Amorphous hydrophobic silica | 2.30 | 2.03 | 2.70 | | 2.69 | 7.96 | | 0.40 | 2.16 | 2.20 | 0.45 | 0.51 | 1.99 | 3.85 | 1.20 |

*mean particle size of 10 μm, 90% of the particles are smaller than 25 μm.
**mean particle size of 37 μm, 80% of the particles are larger than 25 μm.

TABLE 2

PROPERTIES OF THERMALLY CONDUCTIVE COMPOSITIONS

| Composition No. | Concentration of Conductive Particles (% by Total Weight) | Viscosity (cP at 25° C.) | Thermal Conductivity (W/m ° K.) |
|---|---|---|---|
| | Inventive Compositions | | |
| 1 | 70% of spherical alumina, fine size | 60,020 | 1.456 |
| 2 | 65% of 3 to 1 spherical alumina to zinc oxide | 46,350 | 1.337 |
| 3 | 65% of spherical alumina | 28,343 | 1.082 |
| 4 | 65% of 2 to 5 fine/coarse spherical alumina | 21,674 | 1.027 |
| 5 | 65% of spherical alumina, large particle size | 33,344 | 1.003 |
| | Comparative Compositions | | |
| 6 | control (no alumina particles) | 3,507 | 0.261 |
| 7 | 75% of 3 to 1 calcined alumina, fine size | 292,000 | 1.700 |
| 8 | 65% of 2 to 1 calcined alumina to alumina | 184,062 | 1.327 |

TABLE 2-continued

PROPERTIES OF THERMALLY CONDUCTIVE COMPOSITIONS

| Composition No. | Concentration of Conductive Particles (% by Total Weight) | Viscosity (cP at 25° C.) | Thermal Conductivity (W/m ° K.) |
|---|---|---|---|
| 9 | 65% of calcined alumina trihydrate | 65,689 | 1.314 |
| 10 | 60% of 3 to 1 calcined alumina to zinc oxide | 33,344 | 1.047 |
| 11 | 60% of 2 to 1 calcined alumina to alumina trihydrate | 60,020 | 1.004 |
| 12 | 55% of 2 to 1 calcined alumina to alumina trihydrate | 27,176 | 0.977 |
| 13 | 60% of calcined alumina | 33,344 | 0.898 |
| 14 | 50% of 2 to 1 calcined alumina to alumina trihydrate | 14,005 | 0.786 |
| 15 | 40% of 3 to 1 calcined alumina to zinc oxide | 18,000 | 0.751 |

These compositions were tested for their performance as thermally conductive compositions. In particular, viscosity and thermal conductivity of the composition were measured. The viscosity of the compositions is considered to be indicative of the fluidity and flowability of the composition. The fluidity and flowability is a useful Theological measurement to determine the extent to which a composition will produce a thin accurate line as used to encapsulate a semiconductor.

The viscosity and thermal conductivity of compositions with different concentrations of thermally conductive particles were measured. Compositions tested contained thermally conductive particles in amounts of 40, 50, 55, 60, 65, 70 and 75% by weight of the total composition. A Brookfield HBTCP 52 viscosity tester was used at 25° C.

Thermal conductivity of the compositions is determined by placing a test sample between two temperature controlled heater plates. One heater is set at a higher temperature than the other to produce a heat flow through the sample. When the temperature of the sample has stabilized, the thermal conductivity is electronically determined by the test apparatus. Thermal conductivity of the sample is the time rate of steady heat flow through a unit area, per temperature gradient, in the direction perpendicular of the isotherm surface.

The testing apparatus consists of a heat flow transducer (HFT) which includes controlled heater plates, thermocouples, and analog computer module. The compositions were pressed and cured into films. The cured films are bubble free, of a size appropriate for the test equipment in use and are of a uniform thickness with variations in thickness not to exceed 10%. The sample should be thick enough to have a thermal resistance within the range of the test equipment with little or no need to stack samples.

Test specimens were prepared by cutting the cured films into approximately 4 inch squares. Three test specimens are prepared for each test point unless additional specimens are specified. Test specimens are conditioned at 23±2° C./50±5% RH for a minimum of 24 hours prior to testing. A calibration sample was tested and had an error of less than 5%. Both sides of the cured test specimen are coated with a heat sink compound, sold under the trademark Dow Corning 340 (available from Dow Corning, Michigan). The coated specimen is placed in the test cell and clamped between the two heaters and the test is thermal conductivity test is run.

As shown in Table 2, composition 7 with 75% of calcined alumina had the highest thermal conductivity and the highest viscosity. Composition 1 with 70% spherical alumina (small particle size) has the second highest thermal conductivity value tested and a substantially lower viscosity than composition 7. In fact, the viscosity of composition 1 is approximately 80% lower than composition 7. Compositions in Table 2 containing spherical shaped alumina particles consistently showed an overwhelmingly high reduction in viscosity over comparable compositions containing other types of thermally conductive particles without a substantial reduction of thermal conductivity values. Thus, it was determined that thermally conductive compositions containing spherical shaped alumina particles have excellent thermal conductivity with superior flowability properties.

The thermally conductive particles were observed to remain in the inventive compositions. Thus, the inventive compositions avoided some of the problems observed in some conventional compositions where the thermally conductive particles settle out of the composition. Compositions containing both spherical alumina particles and zinc oxide had lower viscosity and higher thermal conductivity than comparable compositions with spherical alumina particles without zinc oxide, which themselves had a lower viscosity and higher thermal conductivity than compositions containing other thermally conductive particles.

A fixture test was performed to test the adherence properties of composition 2 by heating a hot plate (set to about 260° C.) with a glass slide on it until the glass slide attains the temperature of about 160° C. to about 162° C. A small drop of the composition was placed on another slide at room temperature and then placed face down on the hot slide for the amount of time that was required for the composition to adhere to the slide. The slides were affixed to each other by the adhesive composition in about 12 seconds. From the fixture test, composition 2 was determined to have good adherence properties.

The invention being thus described, it will be clear that the same may be varied in many ways. Such variations are not to be regarded as a departure from the spirit and scope of the invention and all modifications are intended to be included within the scope of the claims.

What is claimed is:

1. A low-viscosity, thermally conductive adhesive composition comprising:
    a) a curable resin component;
    b) a curing agent for said resin component; and
    c) at least 65% by weight of thermally conductive spherical particles suspended substantially uniformly throughout said composition, a predominant amount of said particles having an average diameter sufficiently low to maintain said particles in suspension.

2. The adhesive composition according to claim 1 wherein at least 90% of said spherical conductive particles have a diameter of less than 24 microns.

3. The adhesive composition according to claim 1, wherein said spherical particles are present in an amount from about 65% to about 75% by weight of the total composition, and said average diameter is about 10 microns.

4. The adhesive composition according to claim 1, wherein said spherical thermally conductive particles are selected from the group consisting of alumina, zinc oxide, aluminum oxide, magnesium oxide, alumina trihydrate, aluminum nitride, boron nitride, and combinations thereof.

5. The adhesive composition according to claim 1 wherein said curable resin component is an epoxy resin.

6. The adhesive composition according to claim 1 wherein said curable resin component is present in an amount of about 5% to about 60% by weight of the total composition.

7. The adhesive composition according to claim 1 wherein said curable resin component is selected from the group consisting of bisphenol A type epoxy resins, bisphenol F type epoxy resins, phenol novolac type epoxy resins, ortho-cresol novolac type epoxy resins, brominated epoxy resins and biphenyl type epoxy resins, cyclic aliphatic epoxy resins, glycidyl ester type epoxy resins, glycidylamine type epoxy resins cresol novolac type epoxy resins, naphthalene type epoxy resins, phenol aralkyl type epoxy resins, cyclopentadiene type epoxy resins, heterocyclic epoxy resins and combinations thereof.

8. The adhesive composition according to claim 1 wherein said curing agent is selected from the group consisting of imidazoles, amines, peroxides, anhydrides and combinations thereof.

9. The adhesive composition of claim 1 wherein said curing agent is in an amount from about 0.1% to about 10% of the total weight of the composition.

10. The adhesive composition of claim 1 wherein said curing agent is selected from the group consisting of amines, peroxides, anhydrides, phenol compounds, arid anhydrides and combinations thereof.

11. The adhesive composition according to claim 1 wherein said curing agent is an imidazole compound comprising the structure:

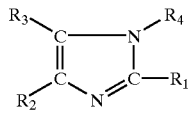

wherein $R_1$, $R_2$, $R_3$ and $R_4$ are each independently optionally substituted lower alkyl groups of 1 to 4 carbon atoms, alkaryl groups, benzyl groups, or H.

12. The adhesive composition according to claim 1, further including an additive selected from the group consisting of inhibitors, suspension aiding agents, coloring agents, fluorescent agents, and combinations thereof.

13. The composition according to claim 12 wherein said suspension aiding agents is selected from the group consisting of fused silica, precipitated silica, fumed silica, calcined silica, zinc oxide, calcined clay, carbon black, glass beads, alumina, talc, calcium carbonate, clay, alumina hydroxide, barium sulfate, titanium dioxide, aluminum nitride, silicon carbide, silicon nitride, beryllium oxide, cerium oxide, kaolin, mica and zirconia, metal viscosity modifiers such as metallic silicon, silver, nickel and copper magnesium oxide, chromic oxide, zirconium oxide, aluminum oxide, alpha quartz, graphite, cork, cotton, synthetic fibers and combinations thereof.

14. The adhesive composition according to claim 12 wherein said additive is from about 0.1 to about 20.0% by weight of the total composition.

15. The adhesive composition according to claim 1 wherein said composition further includes zinc oxide.

16. An electronic part comprising a wiring circuit board and a semiconductor chip mounted through electrodes to the circuit board, a space between the circuit board and the semiconductor chip as well as the periphery of the semiconductor chip being encapsulated with a thermally conductive adhesive comprising a low-viscosity, thermally conductive adhesive composition comprising:
   a) a curable resin component;
   b) a curing agent for said resin component; and
   c) at least about 65% by weight of thermally conductive spherical particles suspended substantially uniformly throughout said composition, a predominant amount of which have an average diameter sufficiently low to maintain said particles in suspension.

17. An article of manufacture comprising:
   a) an openable container for packaging a flowable thermally conductive adhesive composition; and
   b) a flowable thermally conductive adhesive composition stored in said container, said composition comprising:
      i) a curable resin component;
      ii) a curing agent for said resin; and
      iii) at least about 65% of thermally conductive spherical particles suspended substantially uniformly throughout said composition, a predominant amount of which have an average diameter sufficiently low to maintain said particles in suspension.

18. A method to encapsulate an electronic part comprising:
   a) providing a thermally conductive adhesive composition comprising:
      i) a curable resin component;
      ii) a curing agent for said resin; and
      iii) at least about 65% by weight of thermally conductive spherical particles suspended substantially uniformly throughout said composition, a predominant amount of which have an average diameter sufficiently low to maintain said particles in suspension, and;
   b) applying an effective amount of said composition to said electronic part to encapsulate said electronic part.

19. A method of manufacturing a thermally conductive adhesive composition comprising:
   a) providing at least one curable resin composition; and
   b) combining said curable resin component with at least one curing agent for said curable resin component with thermally conductive spherical particles, said spherical particles comprising at least about 65% of said composition, at least 90% of which have an average diameter sufficiently low to maintain said particles in suspension.

* * * * *

UNITED STATES PATENT AND TRADEMARK OFFICE
CERTIFICATE OF CORRECTION

PATENT NO. : 6,500,891 B1
DATED : December 31, 2002
INVENTOR(S) : Kropp et al.

It is certified that error appears in the above-identified patent and that said Letters Patent is hereby corrected as shown below:

Column 1,
Line 21, reads "...in many applications' such as..." should read
-- ...in many applications such as... --.
Line 46, reads "...200,000-300,00 cps..." should read -- ...200,000-300,000 cps... --.

Column 2,
Line 21, reads "...composition is highly..." should read -- ...composition which is highly... --.

Column 3,
Lines 54-55, reads "...conductive particulars is..." should read -- ...conductive particles is... --.
Line 55, reads "...viscosity with the desire..." should read -- ...viscosity with the desired... --.

Column 4,
Lines 4-5, reads "...of these materials about 0.1..." should read -- ...of these materials are about 0.1... --.
Line 26, reads "...expoxy resins, such as..." should read -- ...epoxy resins, such as... --.
Line 52, reads "...combinations thereof" should read -- ...combinations thereof. --.
Line 55, reads "...combinations thereof  Heat" should read -- ...combinations thereof. Heat --.
Line 66, reads "...combinations thereof In" should read -- ...combinations thereof. In --.

Column 5,
Line 41, reads "...tris(cyanoethyl)phsphine,..." should read -- ...tris(cyanoethyl)phosphine,... --.

Column 6,
Line 4, reads "...combinations thereof" should read -- ...combinations thereof. --.

UNITED STATES PATENT AND TRADEMARK OFFICE
CERTIFICATE OF CORRECTION

PATENT NO. : 6,500,891 B1
DATED : December 31, 2002
INVENTOR(S) : Kropp et al.

It is certified that error appears in the above-identified patent and that said Letters Patent is hereby corrected as shown below:

<u>Column 9,</u>
Line 28, reads "...a useful Theological..." should read -- ...a useful rheological... --.
Line 67, reads "...and the test is thermal..." should read -- ...and the thermal... --.

<u>Column 11,</u>
Line 11, reads "...epoxy resins cresol..." should read -- ...epoxy resins, cresol... --.

Signed and Sealed this

Fifth Day of August, 2003

JAMES E. ROGAN
*Director of the United States Patent and Trademark Office*